United States Patent
Romanov et al.

(10) Patent No.: US 9,010,882 B2
(45) Date of Patent: Apr. 21, 2015

(54) DEBRIS GUARD FOR A WHEEL ASSEMBLY

(75) Inventors: Nikolai Romanov, Pasadena, CA (US); Michael Dooley, Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 332 days.

(21) Appl. No.: 13/455,353

(22) Filed: Apr. 25, 2012

(65) Prior Publication Data

US 2012/0267943 A1    Oct. 25, 2012

Related U.S. Application Data

(60) Provisional application No. 61/517,828, filed on Apr. 25, 2011.

(51) Int. Cl.
| | | |
|---|---|---|
| *B62D 25/16* | (2006.01) | |
| *B62D 55/088* | (2006.01) | |
| *B60S 1/68* | (2006.01) | |
| *B60B 33/00* | (2006.01) | |

(52) U.S. Cl.
CPC .............. *B62D 55/0882* (2013.01); *B60S 1/68* (2013.01); *B60B 33/00* (2013.01); *B60B 2900/211* (2013.01); *B60B 2900/721* (2013.01)

(58) Field of Classification Search
CPC ............ B60B 7/00; B60B 7/04; B62D 55/12; B62D 55/0882; B62D 55/0885; B60S 1/68
USPC ........ 301/37.101, 37.105; 305/100, 110, 115, 305/107
See application file for complete search history.

(56) References Cited

U.S. PATENT DOCUMENTS

| | | | |
|---|---|---|---|
| 3,913,985 A * | 10/1975 | Orr et al. ........................ | 305/107 |
| 4,198,103 A * | 4/1980 | Ward et al. .................... | 305/165 |
| 4,373,759 A | 2/1983 | Greener | |
| 4,818,040 A * | 4/1989 | Mezzancella et al. ........ | 305/107 |
| 4,912,805 A | 4/1990 | Krasznai | |
| 5,193,243 A | 3/1993 | Stegens | |
| 5,435,038 A | 7/1995 | Sauers | |
| 5,452,490 A | 9/1995 | Brundula | |
| 5,967,242 A * | 10/1999 | Caron et al. .................. | 172/817 |
| 6,003,198 A | 12/1999 | Stegens | |
| 6,371,578 B1 * | 4/2002 | Ferguson ...................... | 305/107 |
| 6,591,440 B2 | 7/2003 | Stegens | |
| 6,776,698 B2 * | 8/2004 | Pepin et al. ................... | 451/434 |
| 7,331,587 B1 * | 2/2008 | Hyp et al. ..................... | 280/47.3 |
| 8,074,776 B2 * | 12/2011 | Shimizu et al. .............. | 188/71.1 |
| 8,087,117 B2 | 1/2012 | Kapoor et al. | |
| 8,452,450 B2 * | 5/2013 | Dooley et al. ................. | 700/258 |
| 2006/0005342 A1 * | 1/2006 | Comeau ........................ | 15/256.5 |
| 2014/0125117 A1 * | 5/2014 | Weeks et al. .................. | 305/100 |

\* cited by examiner

*Primary Examiner* — Jason Bellinger
(74) *Attorney, Agent, or Firm* — Knobbe, Martens, Olson & Bear LLP

(57) ABSTRACT

A wheel assembly with a debris guard is disclosed, the debris guard being configured to prevent hair and thread from winding around an axle and interfering with the operation of the wheel. The debris guard, which is mounted between the wheel and the robot chassis, comprises a spool and a plurality of tines. The spool is positioned between the wheel and chassis to collect debris that would otherwise wind around the axle. In the preferred embodiment, the tines are arrayed in proximity to a gap between the debris guard and the hub in order to inhibit debris from migrating to the axle exposed between the guard and wheel. The debris guard is intended for a wide variety of wheeled devices.

12 Claims, 6 Drawing Sheets

DEBRIS GUARD FOR A WHEEL ASSEMBLY

CROSS-REFERENCE TO RELATED APPLICATION(S)

This application claims the benefit of U.S. Provisional Patent Application Ser. No. 61/517,828 filed Apr. 25, 2011, entitled "Hair-guard for wheel assembly," which is hereby incorporated by reference herein for all purposes.

TECHNICAL FIELD

The present invention relates to a self-propelled robot or other device with wheel assembly configured to prevent debris from inhibiting the wheel operation. In particular, the invention relates to a wheel assembly with a guard that prevents hair and thread from winding around the axle, which would prevent the wheel from properly turning.

BACKGROUND

Mobile robots and other wheeled devices operated indoors often collect debris which winds around the axle between the rotating wheel and the stationary housing. The debris commonly includes hair and thread, but may also include other materials that can become entangled such as carpet fibers, lint, string, dental floss, for example, and combinations thereof. The rotation of the wheel produces a winding motion that wraps the debris caught by the wheel tread in between the rotating wheel and the structure to which the wheel is connected. As this debris accumulates around the axle, it generates friction that resists the rotation of the wheel and creates a drag on the motor driving the wheel. The accumulation of even more debris can prevent the wheel from turning all together. There is therefore a need for a wheel design that inhibits debris from bundling around the axle where it can prevent the wheel from turning.

SUMMARY

The preferred embodiment of the present invention features a wheel assembly with a debris guard configured to prevent debris from interfering with the operation of the wheel. The wheel assembly comprises: at least one wheel having a tread and hub, wherein the hub is recessed with respect to the tread; an axle connecting the hub to a motor in the chassis; and a debris guard interposed between the wheel and the chassis, wherein the debris guard comprises a spool and a plurality of tines. The tines are concealed within the recess so that hair and other debris may move directly to the spool where it may collect. In the preferred embodiment, the tines are arrayed in proximity to a gap between the debris guard and the hub in order to inhibit debris from migrating to the axle exposed between the guard and wheel. In some embodiments, the spool is a hollow cylinder which creates a cavity in which debris may collect if it manages to migrate through the tines and down the gap between the wheel and debris guard.

The debris guard may reside between a drive wheel and the chassis or between a non-driven wheel and chassis using either an axle affixed to the wheel or axle affixed to the chassis. That is, the debris guard may be employed with: (i) a wheel hub that is fixed to an axle, where the axle is connected to a powered motor or a powered gear motor assembly mounted with a chassis; (ii) a wheel hub that is fixed to an axle, where the axle connects to a chassis so the wheel is not powered, but rolls from the motion of the chassis across the floor; or (iii) a wheel hub that is mounted on an axle, where the axle is rigidly connected to a chassis, and the wheel hub can rotate relative to the axle. The wheel assembly may be used to enhance any number of wheeled devices including robots, toy vehicles, carts, furniture, for example. Although the debris guard is intended for wheeled devices, it may also be used between any number of rotating and stationary components to prevent damage, exemplary applications including vacuum cleaner brushes and fans.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The present invention overcomes the problems encountered in the prior art using a debris guard that resides between the wheel and a chassis or housing or similar component. The debris guard guides debris away from the axle and toward a collection area where it can bundle up without interfering with the operation of the wheel or drive system. The guard in the preferred embodiment includes a spool and a disk with a comb-like structure along the outer diameter of the disk. The disk and comb prevent the debris from reaching the axle while encouraging movement of debris toward the spool where it can safely accumulate until it is removed by the user.

Figure 1:
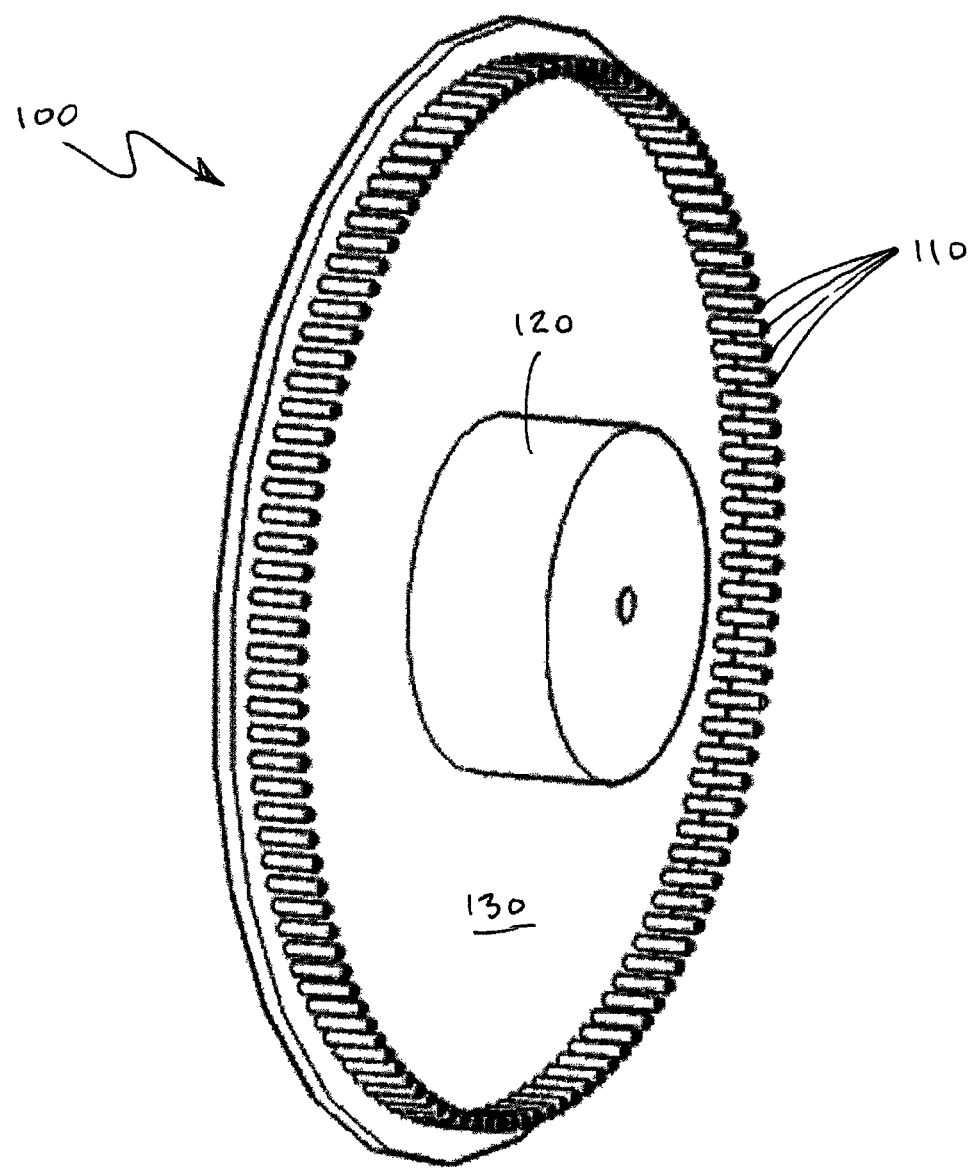
FIG. 1 is an isometric view of the debris guard, in accordance with the preferred embodiment of the present invention.
Figure 2:
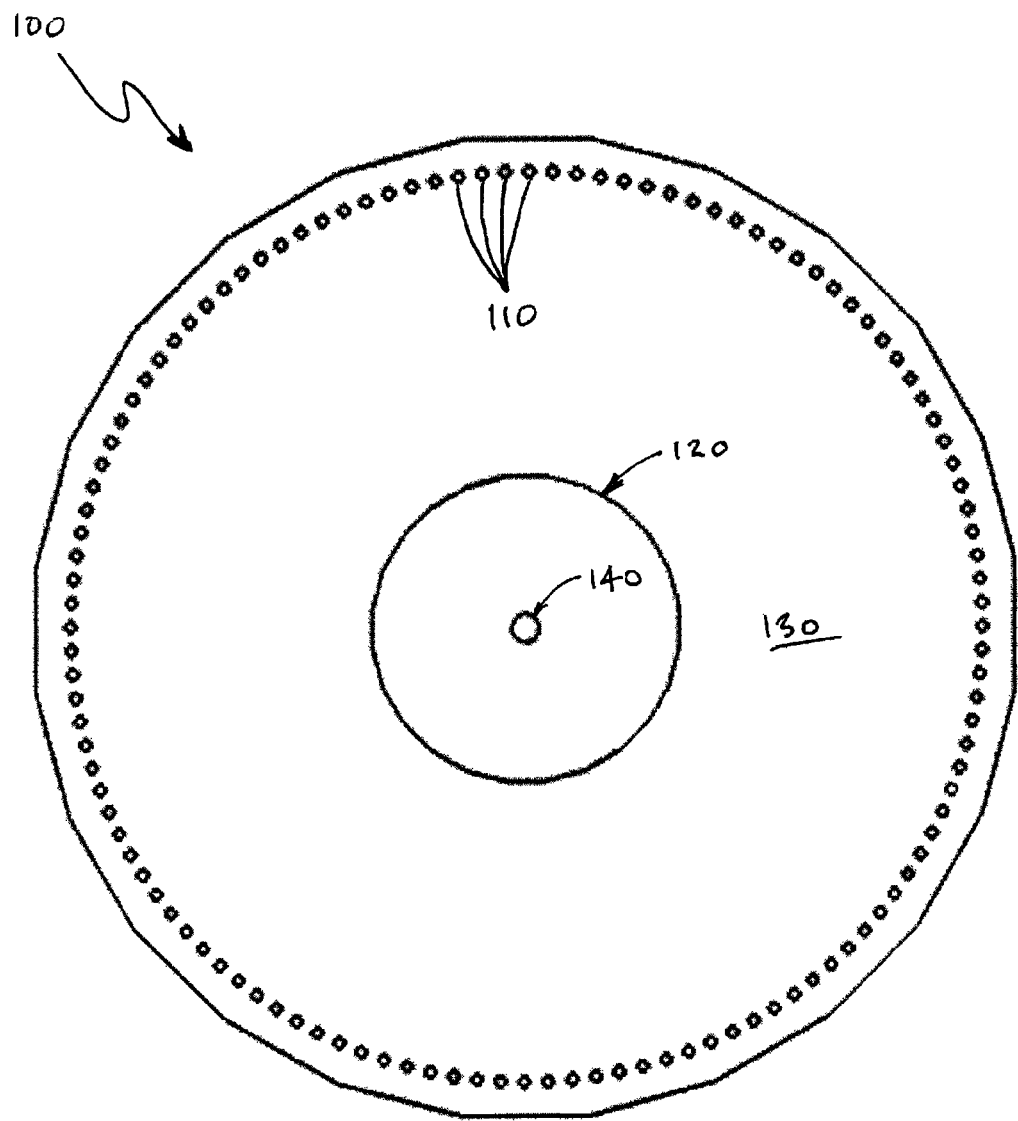
FIG. 2 is a front view of the debris guard, in accordance with the preferred embodiment of the present invention.
Figure 3:
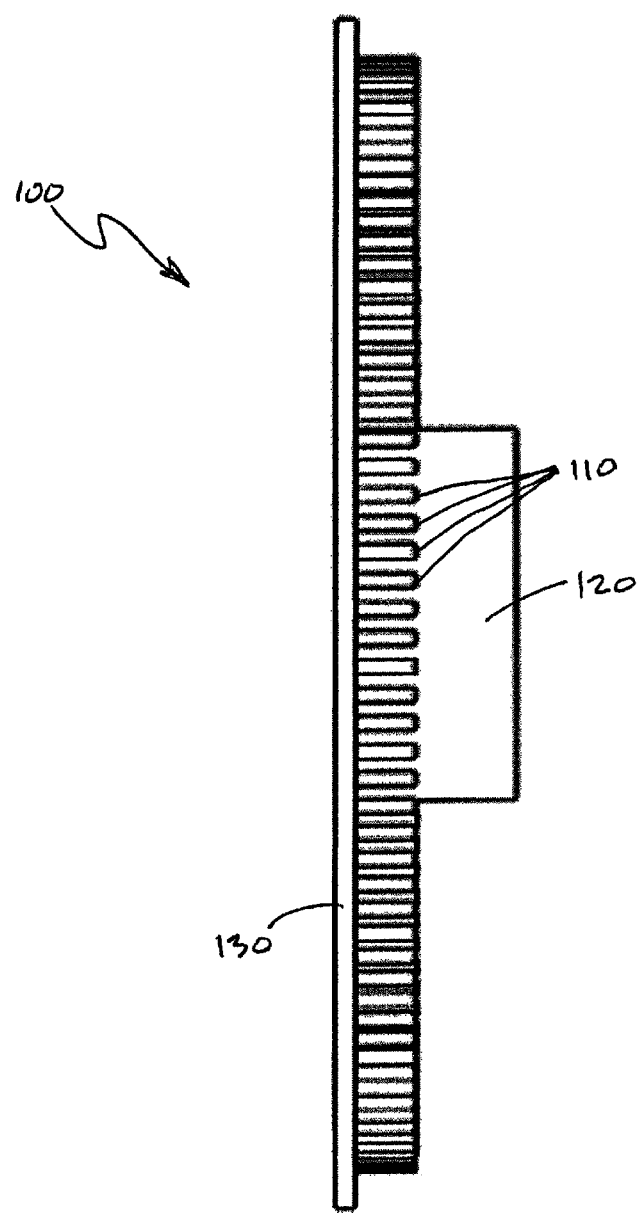
FIG. 3 is a side view of the debris guard, in accordance with the preferred embodiment of the present invention.

Illustrated in FIGS. 1-3 is a debris guard 100 including a spool 120, a disk or backing plate 130, and a plurality of tines 110 mounted around the periphery of the disk. The spool 120 and disk 130 are substantially circular and concentric about the hole 140 configured to receive the axle. The face of the disk is substantially smooth between the tines and the spool to facilitate movement of debris from the tines toward the spool.

The outer surface of the spool 120 may have a cylindrical shape or truncated conical shape in the region between the disk 130 and the point of contact with the mobile robot chassis. The spool 120 is preferably a hollow cylinder to expose the axle, as discussed in more detail below. In some embodiments, the spool 120 includes at least one notch or channel running longitudinally across the spool's outer surface permitting a cutting blade to get underneath and cut debris wrapped around the spool.

The tines 110 may have the shape of a uniform rod, tapered rod, or other extended shape. The longitudinal axis of the tines in the preferred embodiment are oriented parallel with the axle (shown in FIG. 5). The tines generally have a length between 2 and 15 millimeters and a spacing of 2 to 20 millimeters, although the tine length, width, and spacing may vary depending on the size of the wheel and environment in which it operates. In the preferred embodiment, the tines are 4 millimeters (mm) long and separated by 3 mm, and the diameter of the disk is 37. When the debris guard is mounted in the wheel assembly, the tines stand adjacent to a narrow opening between the hub and disk that leads to the axle.

In alternative embodiments, the tines 110 are oriented radially and perpendicular to the axle, oriented pointing toward the axle, or oriented at an intermediate angle between the two preceding cases. In still other embodiments, the debris guard includes pins or tines arrayed in a plurality of concentric rings with different diameters. The tines that make up the comb-like structure may be mounted on the chassis or chassis component instead of the debris guard. In one embodiment, the tines are mounted on the inside surface of the wheel tread, oriented perpendicular to the tread surface and overlapping the gap between the edge of the guard disk and the inner tread surface.

Figure 4:
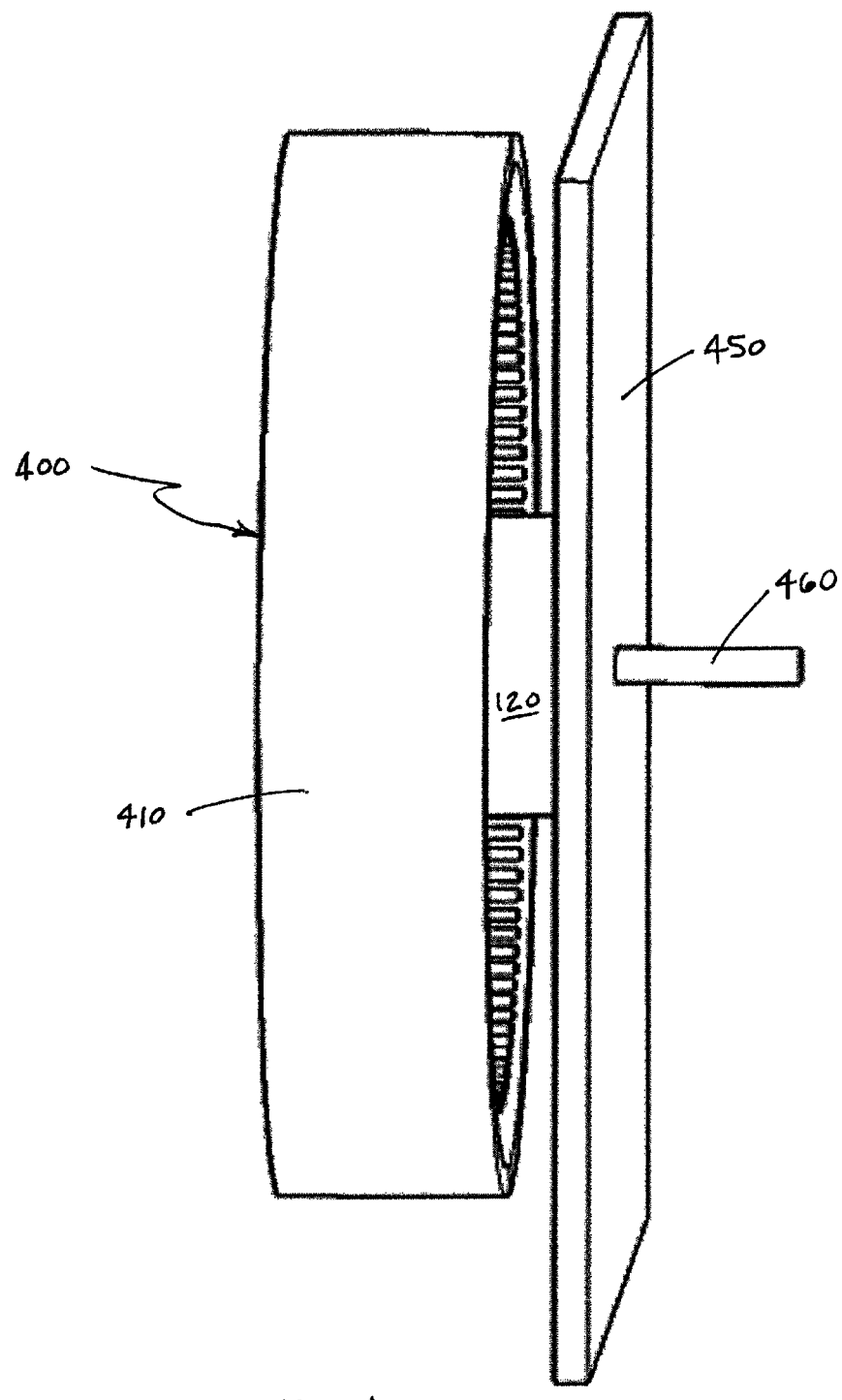
FIG. 4 is an isometric view of the wheel assembly, in accordance with the preferred embodiment of the present invention.
Figure 5:
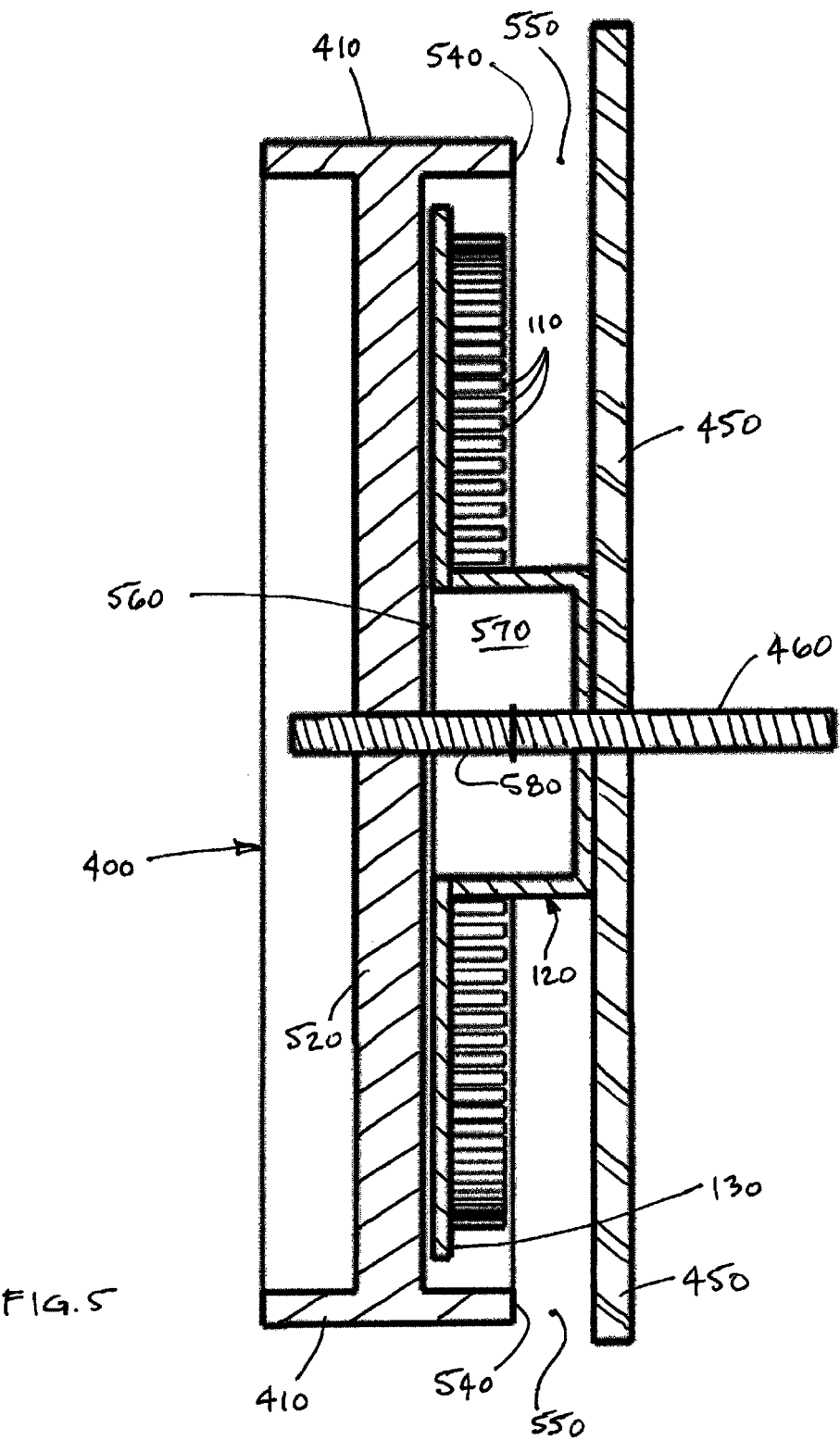
FIG. 5 is a sectional view of the wheel assembly, in accordance with the preferred embodiment of the present invention.

Illustrated in perspective in FIG. 4 and in cross section FIG. 5 is the wheel assembly including the debris guard 100 mounted between a wheel 400 and component of the robot chassis 450, e.g. the chassis, a frame, a housing, a motor, a gear box, a suspension, or similar non-rotating member. The wheel may include a tire tread/rim 410 and hub 520 connected to the chassis 450 by an axle 460. The hub 520, which is rigidly affixed to the axle 460, rotates about its longitudinal axis in response to the torque generated by at least one motor (not shown) or other actuator mounted in the chassis. The debris guard in the preferred embodiment is rigidly affixed to chassis 450 and, therefore, does not turn. In other embodiments, however, the tines, the spool, or both tines and spool are mounted on or affixed to the rotating hub.

In the preferred embodiment, an edge 540 of the rim/tread 410 extends toward the chassis 450 beyond the inner face of the hub 520 to provide a space to conceal a portion of the guard. In particular, the rim 540 horizontally overhangs the tines 110 and disk 130 to conceal the comb-like structure along the outer diameter, thus reducing the chance of debris entering the space 550 between the wheel and chassis from snagging on the tines. The spool 120, on the other hand, resides at a position that squarely lines up with the space 550 between the rim 410 and chassis 450 where it protects the axle from debris that migrates there between. That is, the spool 120 is interposed between the edge 540 of the rim and chassis 450 at a point coinciding with the gap 550 between the rim and chassis to encourage stray hair and thread entering via the gap to wind around the spool. As shown, the entire gap 550 between the wheel and chassis aligns radially with the spool.

In contrast to the spool which collects debris, the comb repels debris to prevent it from migrating into the gap 560 between the disk and hub. Debris that reaches the space between the disk and wheel may migrate to the axle and become entangled around the axle. To minimize the harm of debris that reaches the axle, the spool includes a large inner cavity 570 and a length 580 of exposed axle. The size of cavity 570 allows a large quantity of debris to accumulate before the bundle of debris would start interfering with the axle rotation. In general, the larger the capacity for debris, the longer the robot can operate without the debris disabling the wheel from turning.

Figure 6:
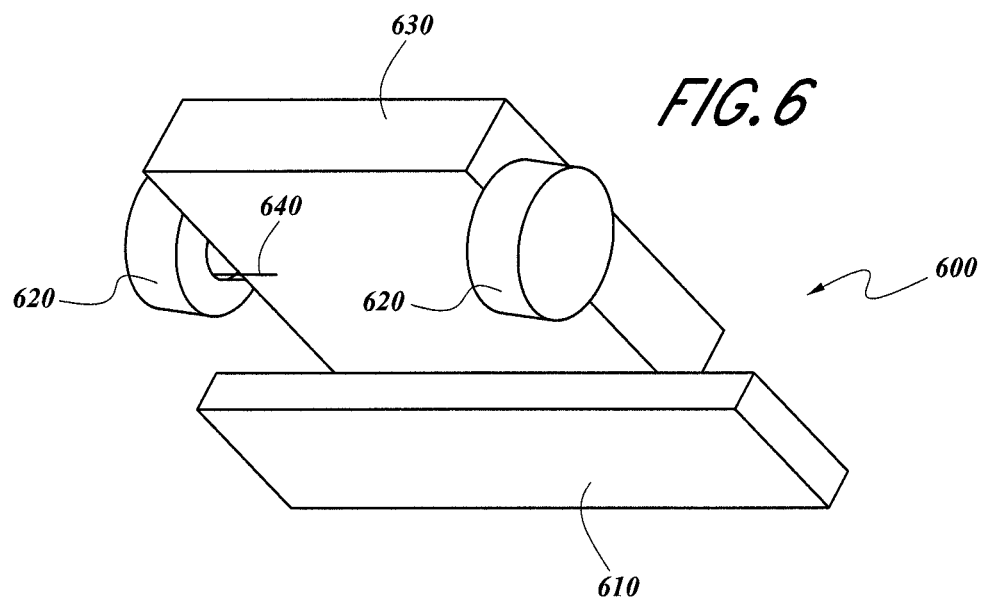
FIG. 6 is a perspective view of the underside of a mobile cleaning robot including two wheels, in accordance with the preferred embodiment of the present invention.
Figure 7:
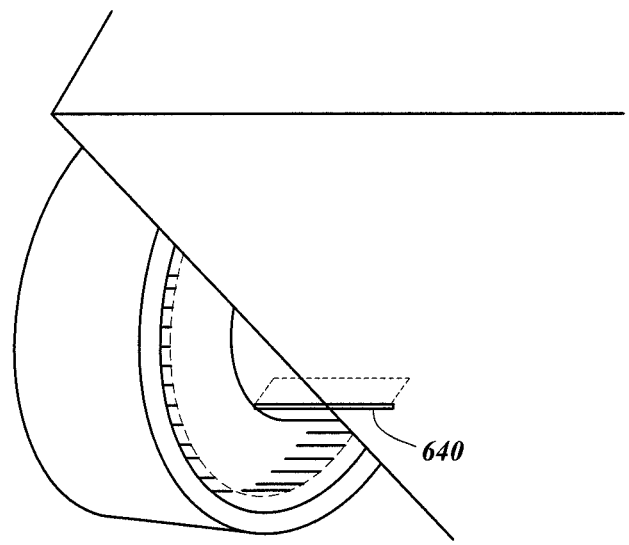
FIG. 7 is a perspective view of the underside of a wheel assembly, in accordance with the preferred embodiment of the present invention.

Illustrated in FIGS. 6 and 7 is a perspective view of the underside of a mobile robot 600 described in detail in pending application Ser. No. 12/429,963 filed Apr. 24, 2009 which is hereby incorporated by reference herein. The robot is configured to navigate within peoples' homes and clean various floor surfaces. The robot includes a cleaning pad 610, drive wheels 620 for propelling the robot, and a chassis 630 for housing the motors that power the wheels to push the cleaning pad across a floor. In other embodiments, the robot may further include one or more caster wheels that passively swivel as the robot turns. One or more of the wheels may include the debris guard of the present invention to protect the wheels from debris which, if not captured by the spool, would eventually cause a drag on the motor or bind the wheels and prevent them from moving.

As can be seen, the chassis and spool may include a channel or groove 640 for removing debris from the spool. The channel 640 is configured to receive a knife or other blade, thus enabling a person to get under the debris and effectively cut debris that has tightly wound around the spool. After cutting, the debris can easily be removed manually by pulling the debris away from the spool. The channel is preferably up to 5 millimeters wide and up to a centimeter deep.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What we claim is:

1. A wheel assembly for a mobile robot apparatus with a chassis component, the wheel assembly comprises:
   at least one wheel comprising a tread and a hub, wherein the hub is recessed with respect to the tread;
   an axle connecting the hub to the chassis component, the axle having a longitudinal axis; and
   a debris guard interposed between the wheel and the mobile robot apparatus chassis component, wherein the debris guard does not rotate relative to the mobile robot apparatus chassis component, wherein
   the debris guard is stationary with respect to the chassis component,
   the debris guard further comprises a backing plate separated from the wheel by a channel to the axle, and
   the channel accesses a cavity between the wheel and the debris guard, wherein the cavity is formed by a hollow spool.

2. The wheel assembly in claim 1, wherein tines are mounted to the backing plate.

3. The wheel assembly in claim 2, wherein the tines are oriented substantially parallel to the axle.

4. The wheel assembly in claim 3, wherein the tines are distributed about a circle concentric with the axle.

5. The wheel assembly in claim 1, further comprising tines which form a comb protectively concealing the axle, wherein the comb resides in proximity to the channel between the wheel and the debris guard.

6. The wheel assembly in claim 1, wherein the spool is aligned along the longitudinal axis with a first gap between the wheel and the chassis component.

7. The wheel assembly in claim 6, wherein the spool is a cylinder concentric with the longitudinal axis.

8. The wheel assembly in claim 6, wherein the wheel is removable for cleaning of the spool.

9. The wheel assembly in claim 6, wherein the spool comprises a longitudinal channel for cutting away debris from the spool.

10. The wheel assembly in claim 6, wherein the hub includes a groove or channel for removing debris from the spool.

11. A wheel assembly for a mobile apparatus with a chassis component, the wheel assembly comprises:
- at least one wheel comprising a tread and a hub, wherein the hub is recessed with respect to the tread;
- an axle connecting the hub to the chassis component, the axle having a longitudinal axis; and
- a debris guard interposed between the wheel and the chassis component, wherein the debris guard comprises a spool and a plurality of tines,
- wherein the spool is aligned along the longitudinal axis with a first gap between the wheel and the chassis component and wherein the hub includes a groove or channel for removing debris from the spool.

12. A wheel assembly for a mobile apparatus with a chassis component, the wheel assembly comprises:
- at least one wheel comprising a tread and a hub, wherein the hub is recessed with respect to the tread;
- an axle connecting the hub to the chassis component, the axle having a longitudinal axis; and
- a debris guard interposed between the wheel and the chassis component, wherein the debris guard comprises a hollow spool and a plurality of tines,
- wherein the debris guard further comprises a backing plate to which the tines are mounted and wherein the backing plate is separated from the wheel by a channel to the axle, wherein the channel accesses a cavity between the wheel and the debris guard and the cavity is formed by the hollow spool.

\* \* \* \* \*